United States Patent
Kitashou et al.

(10) Patent No.: US 9,414,033 B2
(45) Date of Patent: Aug. 9, 2016

(54) IMAGE PROCESSING APPARATUS AND IMAGE PROCESSING METHOD

(71) Applicant: CANON KABUSHIKI KAISHA, Tokyo (JP)

(72) Inventors: Tetsurou Kitashou, Tokyo (JP); Akihiro Takamura, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 14/329,097

(22) Filed: Jul. 11, 2014

(65) Prior Publication Data

US 2015/0029407 A1   Jan. 29, 2015

(30) Foreign Application Priority Data

Jul. 24, 2013   (JP) ................. 2013-153832

(51) Int. Cl.
 *H04N 9/31*   (2006.01)
 *G03B 21/14*   (2006.01)

(52) U.S. Cl.
 CPC ............ *H04N 9/3185* (2013.01); *G03B 21/147* (2013.01)

(58) Field of Classification Search
 CPC . H04N 9/3179; H04N 9/3185; H04N 9/3197; H04N 5/74; G03B 21/147
 See application file for complete search history.

(56) References Cited

U.S. PATENT DOCUMENTS

| | | | |
|---|---|---|---|
| 6,367,933 B1* | 4/2002 | Chen | H04N 9/3185 348/744 |
| 8,014,629 B2 | 9/2011 | Kitashou | |
| 2005/0151934 A1* | 7/2005 | Akutsu | H04N 9/3102 353/69 |
| 2007/0058136 A1* | 3/2007 | Sakai | G03B 21/26 353/34 |
| 2009/0015730 A1* | 1/2009 | Arakawa | H04N 9/3185 348/744 |
| 2011/0025708 A1 | 2/2011 | Takeichi et al. | |
| 2013/0021585 A1* | 1/2013 | Tamura | G09G 5/00 353/69 |

FOREIGN PATENT DOCUMENTS

| | | |
|---|---|---|
| JP | 3394551 B2 | 4/2003 |
| JP | 2011-199575 A | 10/2011 |

* cited by examiner

*Primary Examiner* — Sultan Chowdhury

(74) *Attorney, Agent, or Firm* — Fitzpatrick, Cella, Harper & Scinto

(57) ABSTRACT

An image processing apparatus generates image data for projection by applying a deformation process to obtained image data based on an input parameter related to the deformation process. The image processing apparatus prohibits execution of the deformation process if it is determined that a magnification related to the deformation process based on the input parameter with respect to the obtained image data is out of a predetermined range.

16 Claims, 8 Drawing Sheets

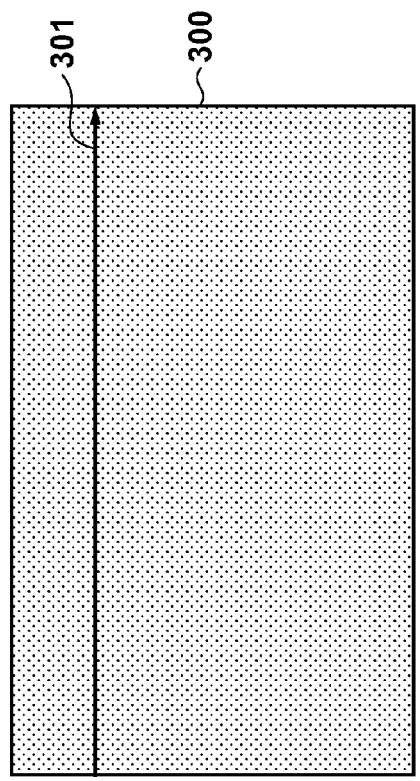
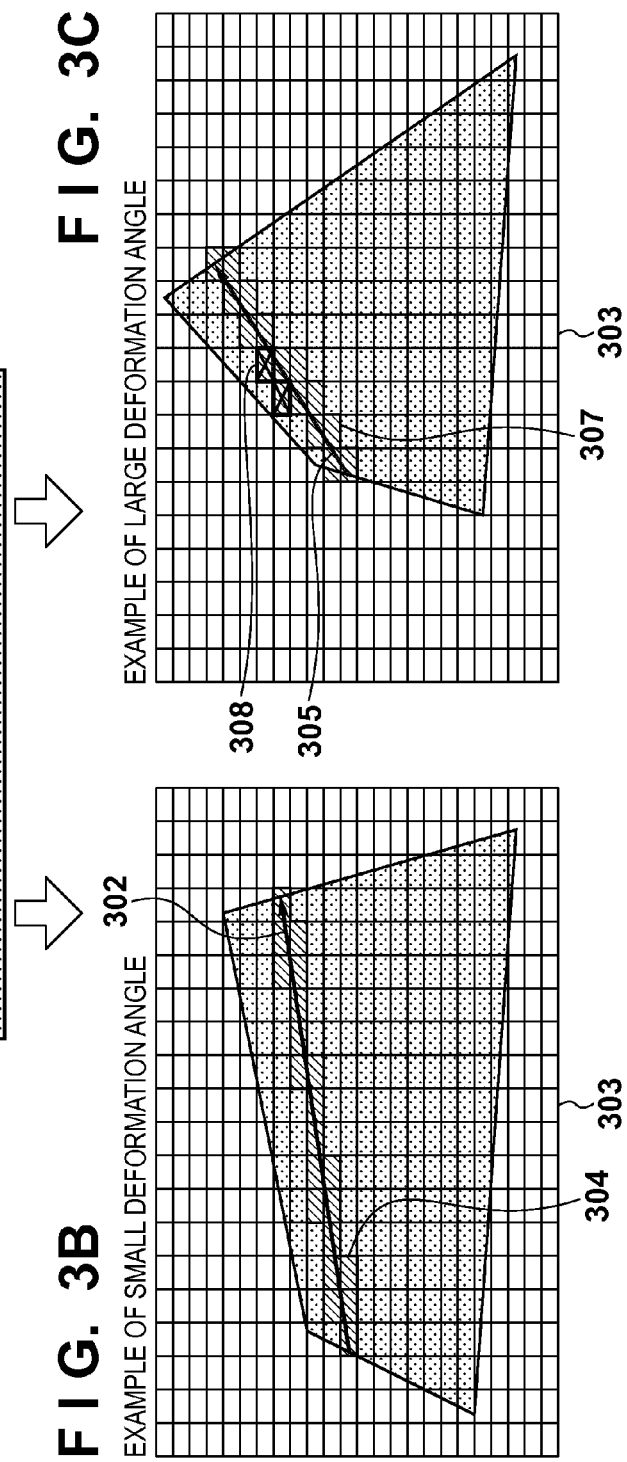

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

An image deformation process is often necessary in a video processing apparatus. For example, an image deformation process called a keystone (trapezoid) correction process is executed for a projector product. Specifically, when output light of a projector is projected on a screen, a trapezoidal distortion occurs in an effective region projected on the screen, due to an installation angle of the projector, an optical lens shift, or the like. It is hard for the user to see an image with the trapezoidal distortion. Therefore, a process is executed, wherein the effective region is deformed to an inverted trapezoidal shape, and the image is deformed so that the effective region projected on the screen forms a rectangular shape. The image deformation process is generally known as a keystone (trapezoid) correction process.

A frame memory in a size that can hold an input image is generally used in a method of executing the image deformation process. Specifically, there are a method of deforming the image when the input image is written in the frame memory and a method of deforming the image when the image is read from the frame memory. Of these, the method of deforming the image when the input image is written in the frame memory is described in Japanese Patent No. 3394551 (hereinafter, Literature 1). Literature 1 discloses a method of executing an image deformation process by writing pixels of an input image in corresponding addresses on the frame memory. Meanwhile, the method of deforming the image when the image is read from the frame memory is described in Japanese Patent Laid-Open No. 2011-199575 (hereinafter, Literature 2).

In general, a higher resolution, a higher frame rate, and the like are demanded in a video processing apparatus. To meet the demand in the image deformation process, the throughput of the frame memory needs to be improved to improve the processing capacity. To improve the throughput of the frame memory, a type of a memory called a cache memory is usually included in a section of interface with the frame memory. When the frame memory and the cache memory are compared, the frame memory is a low-speed and high-capacity memory, while the cache memory is a high-speed and low-capacity memory. In the configuration of deforming the image when the input image is written in the frame memory, the cache memory is arranged before writing in the frame memory. On the other hand, in the configuration of deforming the image when the image is read from the frame memory, the cache memory is arranged after reading from the frame memory. The arrangement of the cache memory in this way integrates data in the cache memory and reduces the number of data accesses to the frame memory in the image deformation process. As a result, overheads of data accesses can be reduced, resulting in an improvement in the throughput of the frame memory.

Although Literature 1 is a method of deforming the image when the input image is written in the frame memory, the cache memory is not included. On the other hand, Literature 2 is a method of deforming the image when the image is read from the frame memory, and the cache memory is included.

In the image deformation process, deformable shapes are limited due to restrictions on the device configuration. For example, deformations with small deformation magnifications are limited in the configuration with the cache memory in the method of deforming the image when the image is read from the frame memory as in Literature 2. A simple example of reducing an image to 1/N in a transverse direction will be considered. In this case, if the output rate is constant, reading from the frame memory needs to be performed at a speed of N times the output rate on average. More specifically, the cache memory arranged on the reading side of the frame memory needs to read image data from the frame memory at a throughput of N times the output rate. If the image data reading of the cache memory does not reach N times, the output rate to be realized in the cache memory cannot be realized, and the deformed image is ruined.

The phenomenon is an example, and there are actually various deformation restrictions due to restrictions on the cache memory. Therefore, the image deformation apparatus needs to include a method of determining whether the deformation shape designated by the user satisfies various deformation restrictions to allow deformation and notifying the user of the determination. If the method of determining whether the deformation is possible is not included, the deformation shape designated by the user cannot be prevented when the deformation shape does not satisfy the deformation restrictions, and a ruined deformed image is output.

In relation to the cache memory and the deformation restrictions, there are no deformation restrictions derived from the cache memory in the method of Literature 1, because the method does not include a cache memory. However, unlike the case in which the cache memory is used, the processing capacity cannot be improved. On the other hand, the method of Literature 2 includes a cache memory, but does not include means for determining the deformation restrictions. Therefore, deformation shapes that are not allowed to form cannot be prevented.

SUMMARY OF THE INVENTION

According to an embodiment of the present invention, provided are an image processing apparatus and an image processing method that can prevent output of a ruined deformed image, while improving the processing capacity by holding a cache memory.

According to one aspect of the present invention, there is provided an image processing apparatus comprising: an obtaining unit configured to obtain image data; an input unit configured to input a parameter related to a deformation process; a processing unit configured to generate image data for projection by applying the deformation process to the obtained image data based on the parameter input by the input unit; and a control unit configured to control the processing unit not to perform the deformation process if the control unit determines that a magnification related to the deformation process for the obtained image data based on the parameter input by the input unit is out of a predetermined range.

According to another aspect of the present invention, there is provided an image processing method comprising: an obtaining step of obtaining image data; an input step of inputting a parameter related to a deformation process; a processing step of generating image data for projection by applying the deformation process to the obtained image data based on the parameter input in the input step; and a control step of controlling the processing step not to perform the deformation process if it is determined that a magnification related to the deformation process for the obtained image data based on the parameter input in the input step is out of a predetermined range.

Further features of the present invention will become apparent from the following description of exemplary embodiments (with reference to the attached drawings).

BRIEF DESCRIPTION OF THE DRAWINGS

FIGS. 3A to 3C are diagrams explaining inclination determination conditions.

DESCRIPTION OF THE EMBODIMENTS

Hereinafter, an example of a preferred embodiment of the present invention will be described with reference to the attached drawings. The present embodiment provides a configuration of determining availability of deformation in, for example, an image processing apparatus (hereinafter, "image deformation apparatus") that deforms an image in a projector. The image deformation apparatus of the present embodiment determines whether deformation to a deformation shape designated by a user is possible in an image deformation process known as a keystone correction function (or a trapezoid correction function) of the projector.

Figure 1:
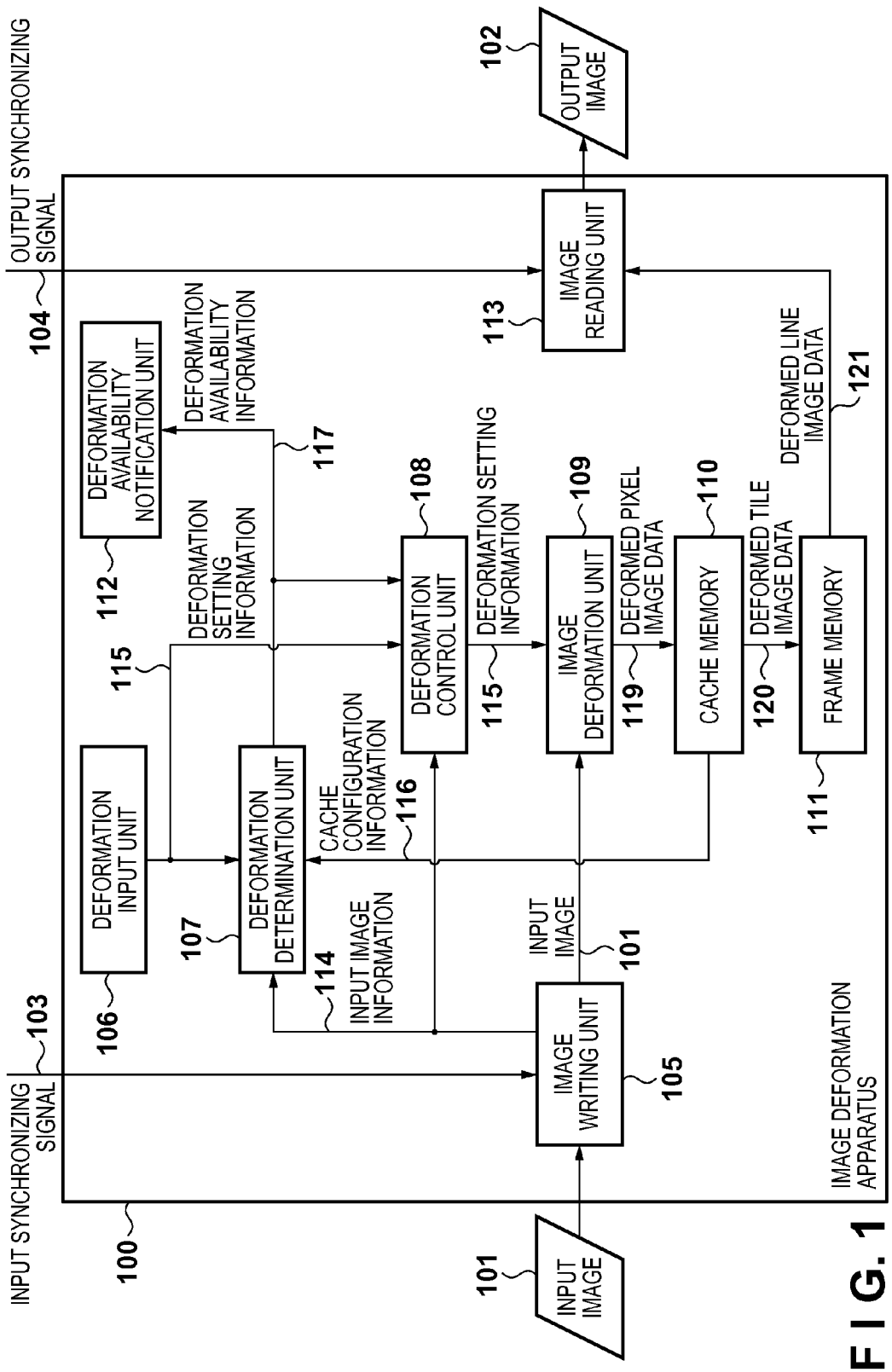
FIG. 1 is a block diagram showing a first embodiment.
Figure 2A:
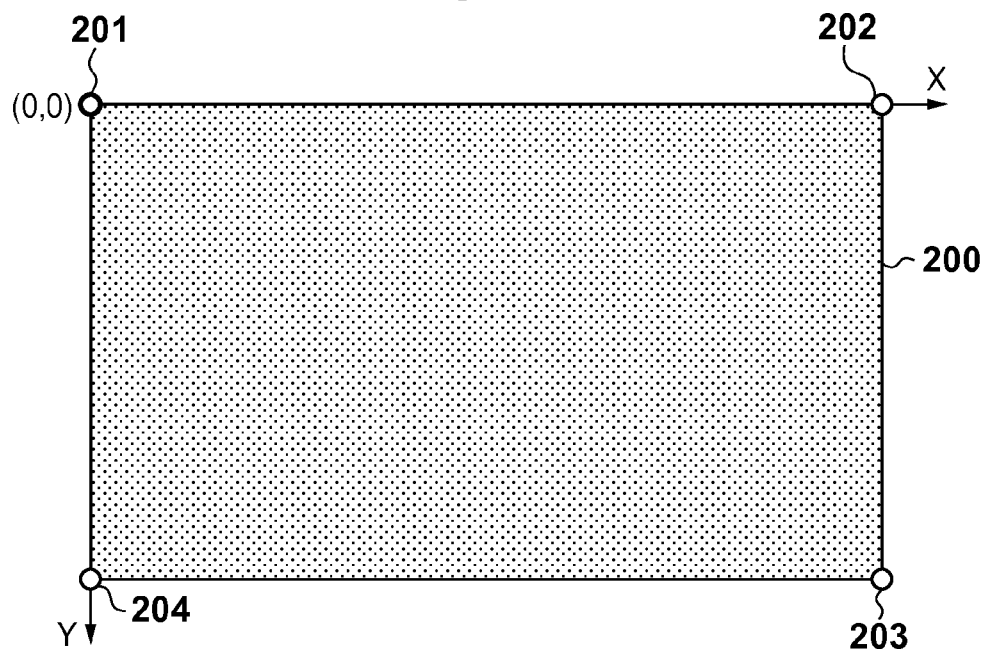
FIGS. 2A and 2B are diagrams showing relationships between coordinates before deformation and coordinates after deformation.
Figure 2B:
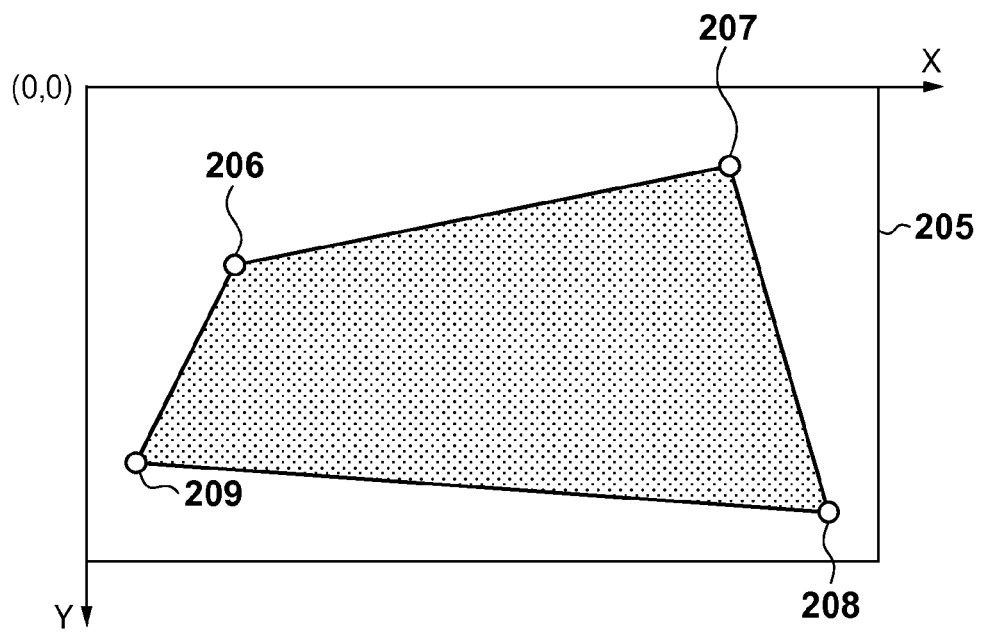
Figure 4A:
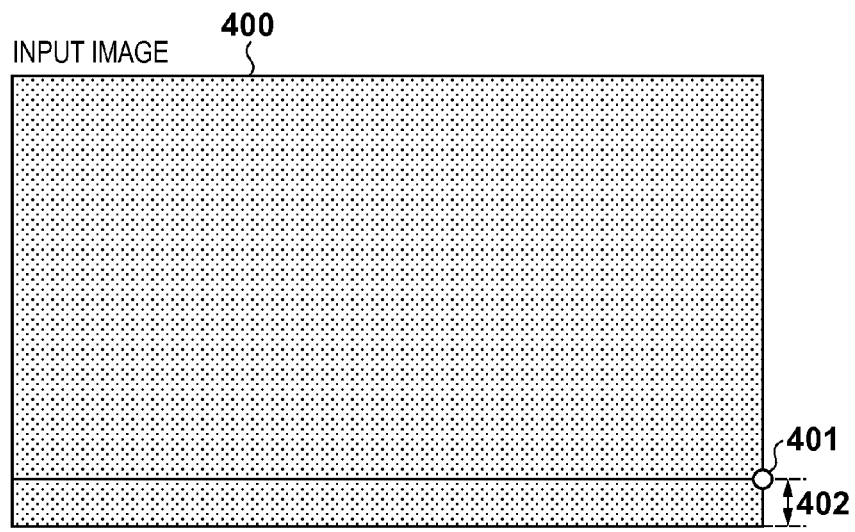
FIGS. 4A and 4B are diagrams explaining a determination process in a vertical direction.
Figure 4B:
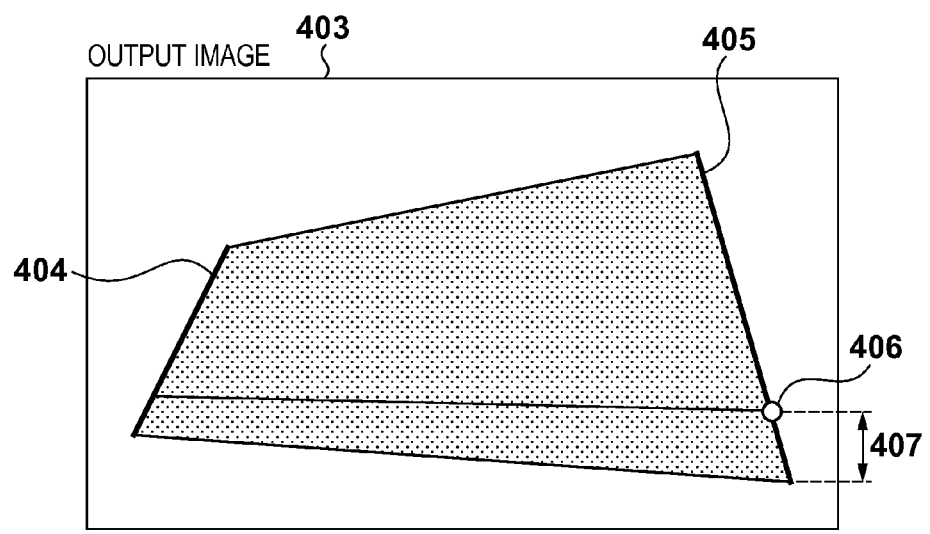
Figure 5A:
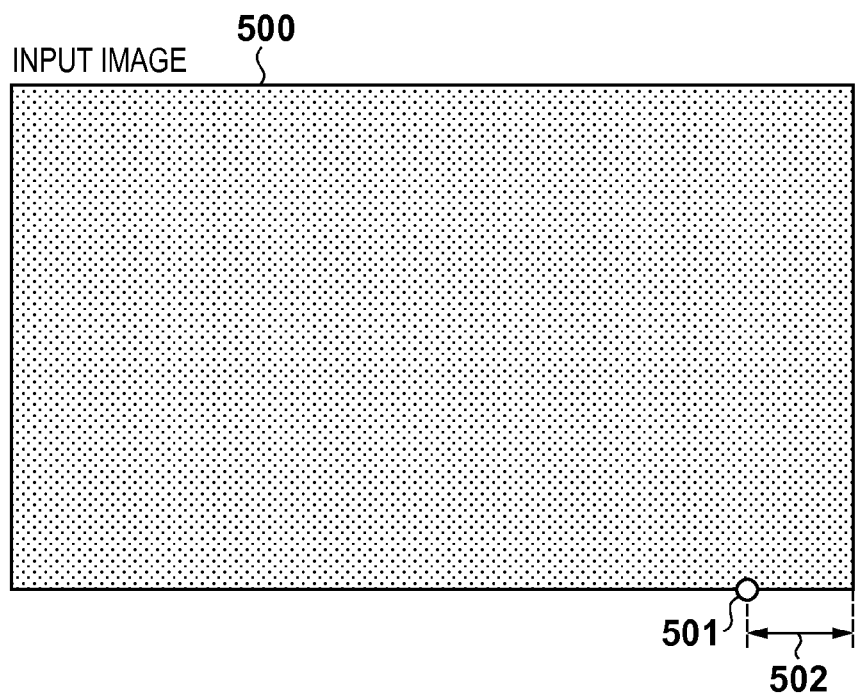
FIGS. 5A and 5B are diagrams explaining a determination process in a horizontal direction.

FIG. 1 shows a configuration example of the image formation apparatus according to the embodiment. FIGS. 2A and 2B are diagrams explaining an example of a deformation process executed in the present embodiment. FIG. 6 is a diagram showing a configuration of information used in the present embodiment. FIGS. 2A, 2B, and 6 are referenced as necessary in the description of the embodiment of FIG. 1. Other FIGS. 3A to 3C, 4A, 4B, 5A, 5B, 7A, and 7B are diagrams for explaining a deformation determination unit 107 of the embodiment of FIG. 1 in more detail and are referenced to explain the deformation determination unit 107 in more detail in the description of the present embodiment.

An image deformation apparatus 100 shown in FIG. 1 receives an input image 101, an input synchronizing signal 103, and an output synchronizing signal 104 and outputs a deformed output image 102. FIG. 2B shows an example that an input image 200 shown in FIG. 2A is deformed to an output image 205. The images are expressed based on a relationship between coordinates before deformation 0 (201) to coordinates before deformation 3 (204) and coordinates after deformation 0 (206) to coordinates after deformation 3 (209).

In the image deformation apparatus 100, an image writing unit 105 receives the input image 101 and the input synchronizing signal 103 and outputs input image information 114 and the input image 101. The input image information 114 includes the coordinates before deformation 0 to 3 as shown in input image information 600 of FIG. 6. Meanwhile, the input synchronizing signal 103 includes a horizontal synchronizing signal, a horizontal data effective signal, a vertical synchronizing signal, and a vertical data effective signal shown in an input synchronizing signal 602 of FIG. 6. These are general signals for indicating timing in the horizontal direction and the vertical direction in a video signal. The horizontal synchronizing signal indicates a period allowed in the horizontal direction of the video, and the horizontal data effective signal indicates a period displaying the video in the period allowed in the horizontal direction. Meanwhile, the relationship between the vertical synchronizing signal and the vertical data signal is similar to the relationship between the horizontal synchronizing signal and the horizontal data effective signal.

Returning to FIG. 1 to continue the description, the image writing unit 105 receives the input image 101 and calculates the input image information 114 from the image size of the input image 101 to output the input image information 114. The image writing unit 105 sequentially sends out the input image 101 according to the input synchronizing signal 103. A deformation input unit 106 and a deformation availability notification unit 112 are units for the user to perform deformation setting. The deformation input unit 106 receives a deformation instruction of the user and outputs deformation information indicating how to deform the input image (hereinafter, called "deformation setting information 115"). For example, the user inputs the coordinates after deformation 0 to 3 as shown in FIG. 2B through the deformation input unit 106 to instruct the deformation. The deformation setting information 115 includes the coordinates after deformation 0 to 3 as shown in deformation setting information 601 of FIG. 6. Meanwhile, the deformation availability notification unit 112 receives, from the deformation determination unit 107, deformation availability information 117, which is information indicating whether the deformation to the shape designated by the deformation setting information 115 is possible, and notifies the user whether the designated deformation can be performed. Based on the deformation input unit 106 and the deformation availability notification unit 112, the user can set an intended deformation shape and receive a notification of whether the deformation to the deformation shape is possible. A deformation control unit 108 may perform control to prohibit or permit an image deformation unit 109 to execute a deformation process according to the determination result of the availability of the deformation process by the deformation determination unit 107.

The deformation control unit 108 receives the input image information 114, the deformation setting information 115, and the deformation availability information 117 and outputs the deformation setting information 115 input when the deformation availability information 117 indicates that the deformation is possible. The deformation control unit 108 outputs the deformation setting information 115 based on the deformation availability information 117 to control the image deformation apparatus 100 to perform deformation setting of only deformable shapes.

The image deformation unit 109 receives the input image 101 from the image writing unit 105 and the deformation setting information 115 from the deformation input unit 106 to deform the input image 101 and outputs the deformed pixel data (hereinafter, "deformed pixel image data 119"). The image deformation unit 109 obtains the deformed pixel image data 119 by, for example, projective transformation of the input image 101. The deformed pixel image data 119 is pixel-by-pixel image data for outputting, to coordinates after deformation, the input image 101 input according to the input synchronizing signal 103.

The cache memory 110 receives the deformed pixel image data 119 and outputs deformed tile image data 120 integrating the data in tiles. The cache memory 110 also outputs, to the deformation determination unit 107, cache configuration information 116 indicating the configuration of the cache memory 110.

The cache configuration information 116 includes the number of pixels in the horizontal direction, the number of pixels in the vertical direction, and the number of cache tiles in the vertical direction as indicated by cache configuration information 604 of FIG. 6. The number of pixels in the horizontal direction and the number of pixels in the vertical direction are information indicating the configuration of the cache, indicating the numbers of pixels in the horizontal direction and the vertical direction that can be received by one cache tile that receives the deformed pixel image data 119. The number of cache tiles in the vertical direction indicates the number of cache tiles in the vertical direction included in the cache memory 110. The cache memory 110 temporarily holds, in the internal cache tiles, the deformed pixel image data 119 input pixel by pixel and outputs the deformed tile image data 120 tile by tile in order from the cache tiles that are filled with pixels.

The cache configuration information 116 also includes a vertical direction output rate used in a vertical direction determination process and output time per pixel used in a horizontal direction determination process described later. The vertical direction output rate indicates the number of lines that can be output for one input line in the cache memory 110. The output time per pixel is a pixel output rate (output time per pixel) of the cache memory 110. The vertical direction output rate and the pixel output rate are used in the determination process in the vertical direction and the determination process in the horizontal direction described later.

The frame memory 111 receives the deformed tile image data 120 and outputs deformed line image data 121 in order from a line that is filled with data of one line and that can be output.

The image reading unit 113 receives the deformed line image data 121 and the output synchronizing signal 104 and outputs the output image 102 according to timing designated by the output synchronizing signal 104. The output synchronizing signal 104 includes a horizontal synchronizing signal, a horizontal data effective signal, a vertical synchronizing signal, and a vertical data effective signal as indicated by an output synchronizing signal 603 of FIG. 6. The signals are the same as in the input synchronizing signal 602.

The deformation determination unit 107 is configured to determine whether the deformation based on the deformation information designated by the user in the image deformation apparatus 100 can be performed. Roughly, the deformation determination unit 107 executes a process of receiving the input image information 114, the deformation setting information 115, and the cache configuration information 116 to determine whether the deformation shape of the deformation setting information 115 can be realized based on the information. The deformation availability information 117 is output.

Figure 7A:
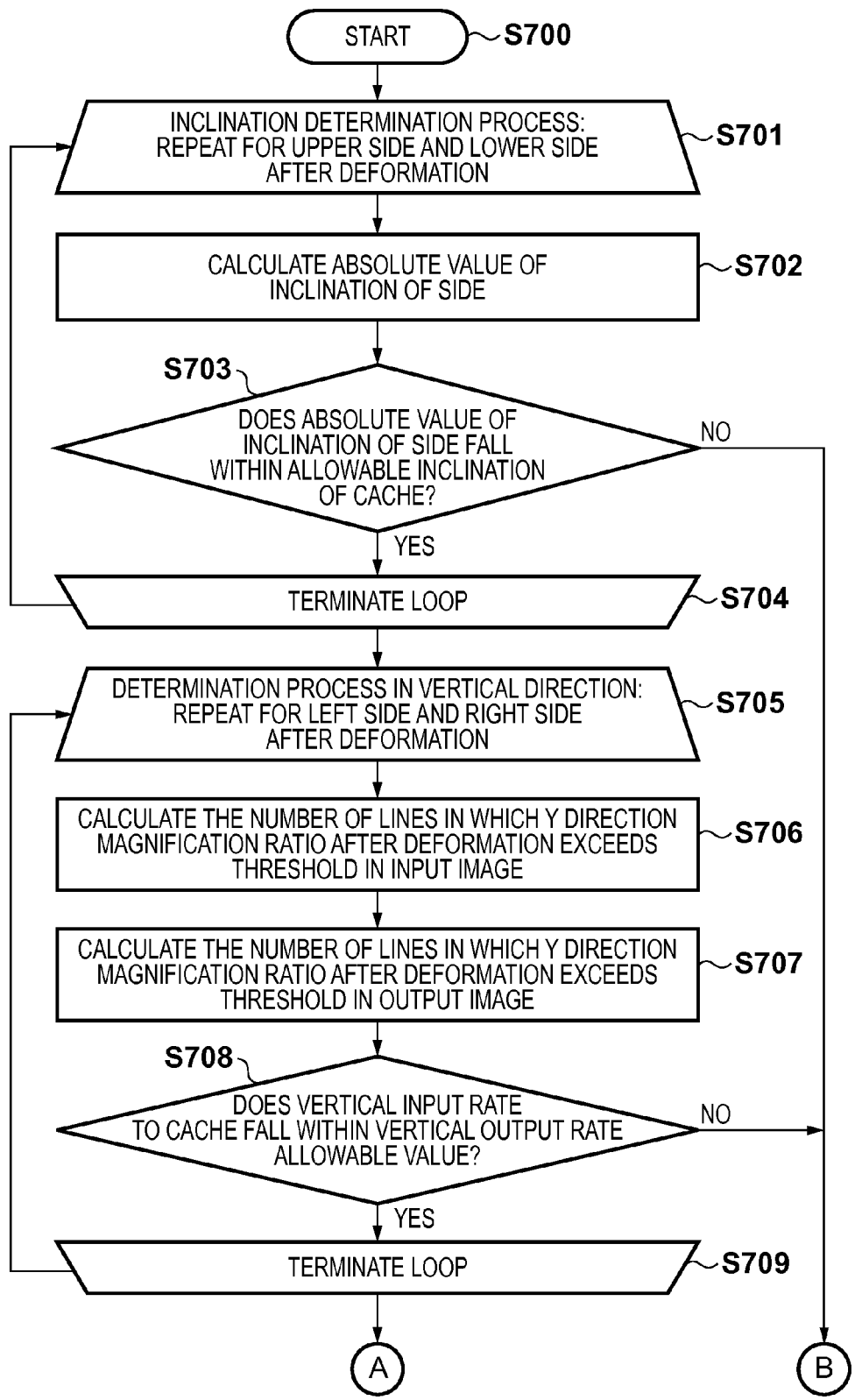
FIGS. 7A and 7B are flow charts showing a deformation determination process.
Figure 7B:
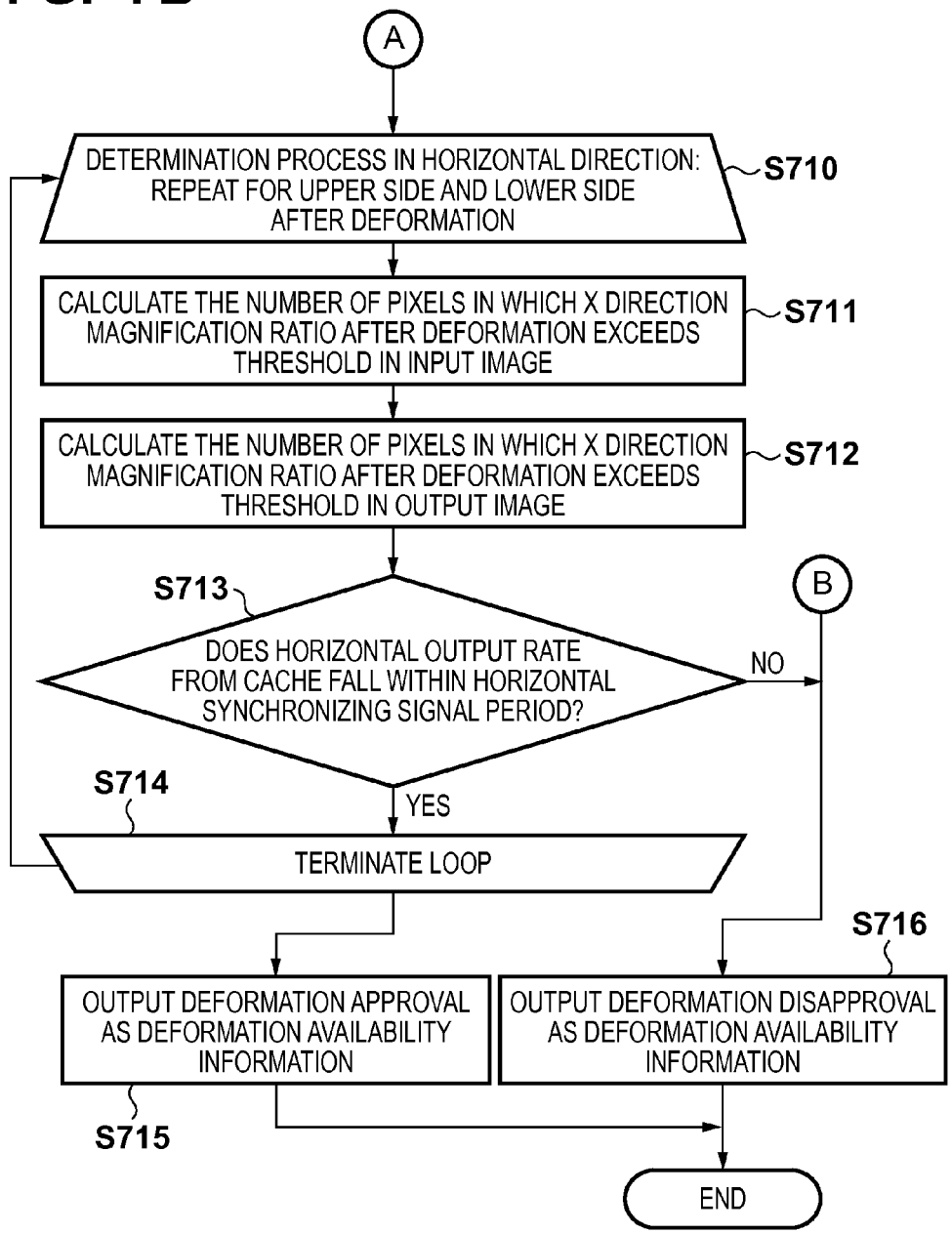

Details of the deformation determination unit 107 will be described in detail with reference to FIGS. 3A to 3C, 4A, 4B, 5A, 5B, 7A, and 7B. FIGS. 7A and 7B are flow charts explaining a deformation determination process by the deformation determination unit 107. The process of FIGS. 7A and 7B roughly includes three determination processes (S701 to S704, S705 to S709, and S710 to S714), and FIGS. 3A to 3C, 4A, 4B, 5A, and 5B show more detailed description of the individual processes. The process of FIGS. 7A and 7B starts from step S700 (start) and moves to step S701 (inclination determination process).

Details of the process of steps S701 to S704 (inclination determination process) will be described with reference to FIGS. 3A to 3C. In step S701 (inclination determination process), the deformation determination unit 107 determines whether the input of pixels determined by the deformation shape (deformed pixel image data 119 from the image deformation unit 109) falls within an allowable inclination of the cache memory 110 (whether restrictions are satisfied). More specifically, whether the cache memory 110 can hold the entire inclined line obtained by deforming one line of the input image is determined. FIG. 3B illustrates an example of deforming an input image 300 shown in FIG. 3A at a small deformation angle, and FIG. 3C illustrates an example of deforming the input image 300 shown in FIG. 3A at a large deformation angle. In the following description, the restrictions are satisfied in the example with the small deformation angle illustrated in FIG. 3B, and the restrictions are violated in the example with the large deformation angle illustrated in FIG. 3C.

The example with the small deformation angle illustrated in FIG. 3B will be described first. When an input order 301 of input image is input in the input image 300, pixel data is input to a lattice 303 of the cache memory as in a line 302 indicating the input order of deformed pixel data. The lattice 303 of the cache memory indicates regions divided by a plurality of cache tiles. For example, the cache tiles used when a line such as the line 302 indicating the input order of the deformed pixel data is input are cache tile groups 304 indicated by hatching. The number of tiles of the cache memory in the vertical direction is a value determined at the design, and the number of tiles of the cache memory in the vertical direction is "2" in the description of this example. Cache tiles that can store pixels of one line are included in the horizontal direction. In this case, the number of cache tile groups 304 that are indicated by hatching and that are consumed when one line is input is two in the vertical direction at the maximum. In the case of FIG. 3B, the number of tiles of the cache memory in the vertical direction falls within "two", and the deformation determination unit 107 determines that the deformation restrictions are satisfied in relation to the inclination determination process.

On the other hand, an inclination of a line 305 indicating the input order of the deformed pixel data is large in the example with the large deformation angle as in the case of FIG. 3C. Therefore, the number of cache tile groups 307 (hatched regions) consumed when one line is input is three in the vertical direction at the maximum. Therefore, there are pixels 308 that cannot be held in the cache memory. In this case, pixels at the positions of the pixels 308 that cannot be held in the cache tile groups 307 cannot be held in the cache memory 110, and a lack of pixel is generated in the image after deformation. Therefore, the deformation determination unit 107 determines that the deformation restrictions are not satisfied in the example of FIG. 3C.

The processing flow will be described with reference again to FIGS. 7A and 7B. In step S701 (inclination determination process), the determination process is applied to an upper side and a lower side after deformation. This is because the inclination in the shape after deformation is the maximum at one of the upper side and the lower side, and the process can be speeded up by applying the process only to the upper side and the lower side. In step S702, the deformation determination unit 107 calculates the inclination of each side. In step S703, the deformation determination unit 107 determines whether the absolute value of the inclination of the side obtained in step S702 falls within the allowable inclination of the cache memory. Specifically, the following determination is performed.

$(Ydst0-Ydst1)/(Xdst0-Xdst1)<\text{cacheHeight}/\text{cacheWidth}*(\text{cacheNum}-1)$ $(Ydst3-Ydst2)/(Xdst3-Xdst2)<\text{cacheHeight}/\text{cacheWidth}*(\text{cacheNum}-1)$ Variables: meaning (Xdst0 to 3, Ydst0 to 3): coordinates after deformation 0 to 3 of the deformation setting information 601 cacheWidth: the number of pixels in the horizontal direction of the cache configuration information 604 cacheHeight: the number of pixels in the vertical direction of the cache configuration information 604 cacheNum: the number of tiles in the vertical direction of the cache configuration information 604.

If one of the determinations is violated in step S703, the process moves to step S716. The deformation determination unit 107 outputs deformation disapproval as deformation availability information and moves to step S717 to end the process. On the other hand, if none of the determinations is violated, the process moves to step S705 (determination process in the vertical direction). The deformation availability notification unit 112 can project an image related to the availability of deformation when the deformation availability information is obtained from the deformation determination unit 107. For example, when the user sets the degree of deformation while referencing an interface image provided by the deformation input unit 106, the display method of the interface image can be switched between the case that further deformation is possible and the case that further deformation is impossible.

In this way, whether the inclination after deformation corresponding to the input of one line of the input image falls within the allowable inclination calculated from the configuration information of the cache memory 110 is determined in the inclination determination process. In the present embodiment, the cache tiles can be handled in step shapes as shown in FIGS. 3B and 3C to improve the tolerance to the inclination by a small cache memory capacity. Obviously, the cache tiles may be fixed and arranged in band shapes. In that case, the allowable inclination of the line after deformation is, for example, "cacheHeight×the number of tiles in the vertical direction/the number of pixels in the main scan direction".

Details of the process of steps S705 to S709 (determination process in the vertical direction) will be described with reference to FIGS. 4A and 4B. In step S705 (determination process in the vertical direction), whether the input rate of the pixels in the vertical direction determined by the deformation shape falls within the allowable output rate of the cache memory 110 is determined. More specifically, the deformation determination unit 107 determines the output speed of the pixel data of the cache memory 110 necessary to output the image after deformation. The deformation determination unit 107 determines whether the determined output speed is in a range of the executable output speed of the cache memory 110. The determination process in the vertical direction will be described with reference to FIGS. 4A and 4B showing an example when an input image 400 is deformed to an output image 403. A Y direction magnification ratio (ratio based on one line of the image before deformation and the number of lines of the image after deformation corresponding to the one line) corresponding to left and right sides (404 and 405) of the output image 403 is continuously changed. If the image after deformation (output image 403) includes a line in which the Y direction magnification ratio exceeds a threshold, the deformation determination unit 107 determines that the deformation process is impossible (S716). A point 406 in which the Y direction magnification ratio exceeds the threshold and the number of lines 407 in which the Y direction magnification ratio exceeds the threshold are determined in FIG. 4B. The threshold is a value indicating the output performance of the cache memory 110, and for example, the threshold is 2 if pixel data of two lines can be output in a period that pixel data of one line is input from the outside. In this case, the vertical direction output rate, which is the number of output lines relative to one input line, of the cache memory 110 is 2.

Parts in the input image 400, which correspond to the point 406 in which the Y direction magnification ratio after deformation exceeds the threshold in the determined output image and correspond to the number of lines 407 in which the Y direction magnification ratio after deformation exceeds the threshold in the output image, are obtained in the input image. The example of FIGS. 4A and 4B indicates the number of lines 402 in which the Y direction magnification ratio after deformation exceeds the threshold and a point 401 in which the Y direction magnification ratio after deformation exceeds the threshold in the input image 400. The check targets in the determination process are a check target 404 of a vertical direction determination condition and a check target 405 of a vertical direction determination condition 405 that are the left and right sides after deformation. This is because the Y direction magnification ratio in the shape after deformation is the maximum at one of the left and right sides after deformation, and the process can be speeded up by applying the process only to the left side and the right side.

If there are pixels in which the Y direction magnification ratio exceeds the threshold at the upper end of the side to be checked in FIGS. 4A and 4B, the number of lines of the output image 403 up to a point in which the Y direction magnification ratio is equal to or smaller than the threshold and the number of lines of a corresponding section of the input image 400 are used. Therefore, in more general expression, the determination process in the vertical direction is executed by using the number of lines of a section where a line in which the Y direction magnification ratio exceeds the threshold continues in the output image and the number of lines of a corresponding section in the input image.

The process flow will be described with reference again to FIGS. 7A and 7B. In step S705 (determination process in the vertical direction), the deformation determination unit 107 applies a process to the left side and the right side after deformation. In step S706, the deformation determination unit 107 calculates the number of lines 402 in which the Y direction magnification ratio after deformation exceeds the threshold in the input image. In step S707, the deformation determination unit 107 calculates the number of lines 407 in which the Y direction magnification ratio after deformation exceeds the threshold in the output image. In step S708, the deformation determination unit 107 determines whether a vertical input rate of the cache falls within a vertical output rate allowable value. Specifically, a determination process using the following conditional expression is executed. In the determination process, if the number of lines increases when the image deformation unit 109 deforms the input image 101 according to the deformation setting information 115, whether the section where the number of lines has increased can be output in an output period of the number of lines at the corresponding section of the input image is determined. Therefore, there is a violation when the following conditional expression ("the number of pixels in the vertical direction× the number of tiles in the vertical direction/the number of pixels in the horizontal direction") is satisfied. The fact that the execution of the deformation process is impossible is notified, and/or the execution of the deformation process is prohibited.

$$dstOverLine > srcOverLine * outLineLimit$$

Variables: meaning outLineLimit: vertical direction output rate of the cache memory 110 srcOverLine: the number of lines 402 of the section corresponding to the section where the Y direction magnification ratio after deformation exceeds the threshold in the input image dstOverLine: the number of lines 407 of the section where the Y direction magnification ratio after deformation exceeds the threshold in the output image.

If the determination in step S708 is violated, the process moves to step S716, and deformation disapproval is output as deformation availability information. The process moves to step S717, and the process ends. On the other hand, if none of the determinations is violated, the process moves to step S710 (determination process in the horizontal direction).

Steps S710 to S714 (determination process in the horizontal direction) will be described with reference to FIGS. 5A and 5B. If the magnification ratio in the horizontal direction after deformation exceeds 1.0, two or more pixels may be output for input of one pixel. Therefore, in such a case, the output time may be large with respect to the input time per line. The data may not be completely output in the cache memory 110, and the data may overflow. In the determination process in the horizontal direction, whether the input per line of the cache memory 110 falls within a period allowed for one line is determined.

Figure 5B:
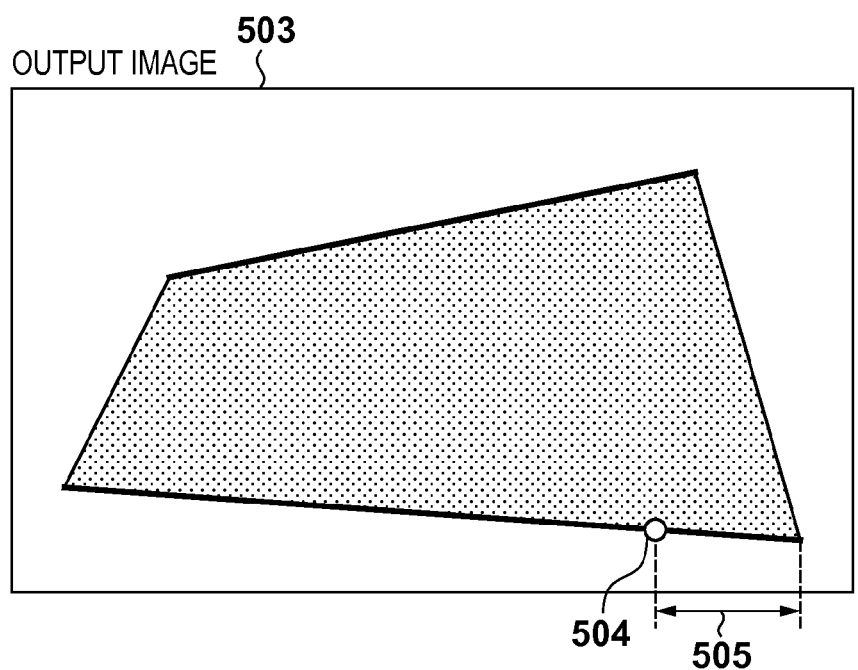
Figure 6:
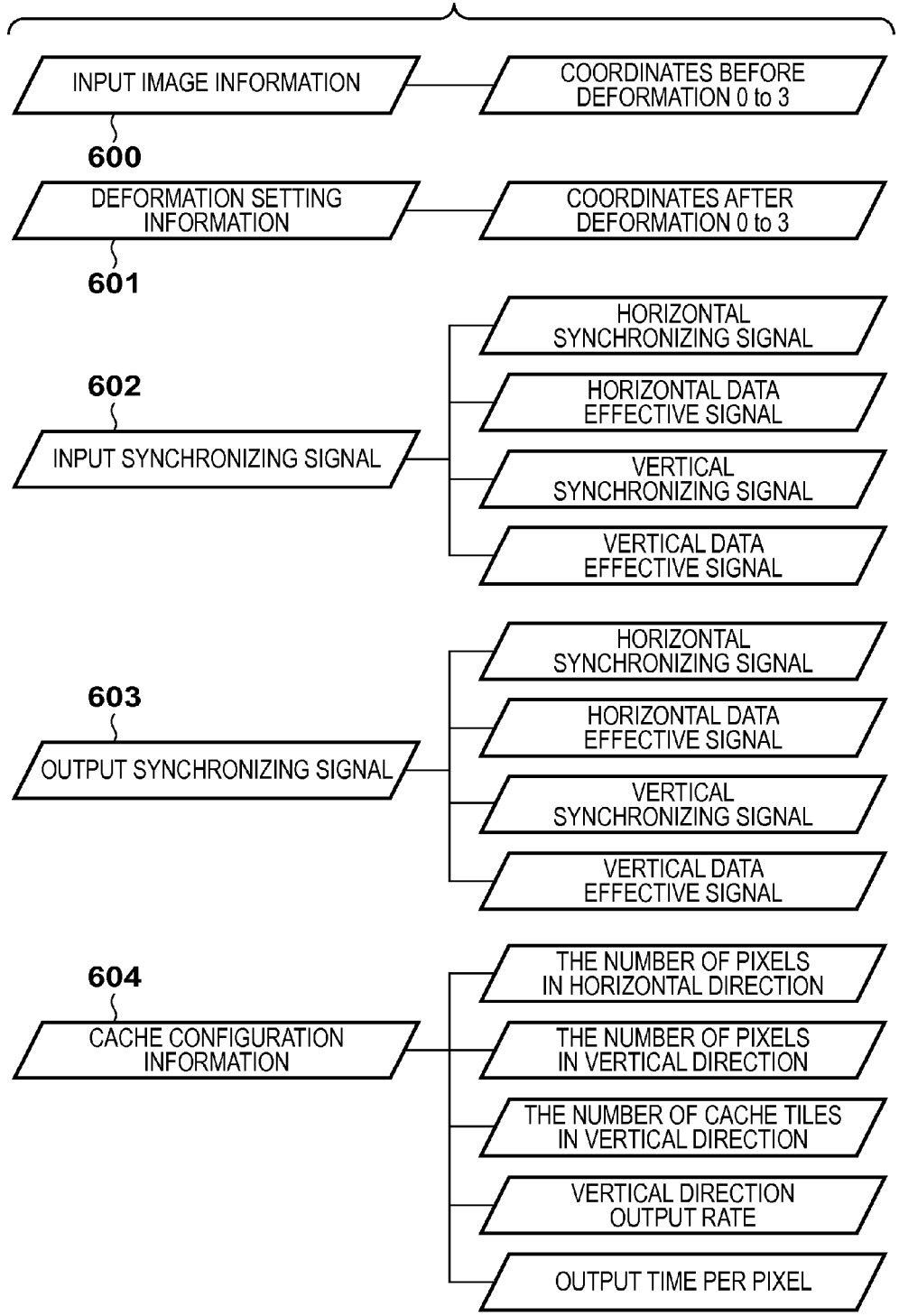
FIG. 6 is a diagram explaining a configuration of information.

FIG. 5B illustrates an example that a point 504 in which an X direction magnification ratio after deformation exceeds a threshold is obtained in the output image, and based on this, the number of pixels 505 in which the X direction magnification ratio after deformation exceeds a threshold is obtained in the output image. Meanwhile, a point 501 in which the X direction magnification ratio after deformation exceeds the threshold in the input image and the number of pixels 502 in which the X direction magnification ratio after deformation exceeds the threshold in the input image are illustrated as parts corresponding to the point 504 and the number of pixels 505 in an input image 500. More specifically, when the number of pixels 502 in which the X direction magnification ratio after deformation exceeds the threshold is input in the input image, pixels equivalent to the number of pixels 505 in which the X direction magnification ratio after deformation exceeds the threshold are output in the output image. An object of the process is to take the increment into account to determine whether the time required for the output falls within one horizontal synchronization period.

If there are pixels in which the X direction magnification ratio exceeds the threshold on the left side of the line to be checked in FIG. 5B, the number of pixels of the output image 503 until the X direction magnification ratio in the main scan direction (from left to right in FIG. 5B) becomes equal to or smaller than the threshold and the number of pixels at the corresponding position of the input image 500 are used. Therefore, in more general expression, the number of pixels of the section where the pixels in which the X direction magnification ratio exceeds the threshold continues in the main scan direction in the output image and the number of pixels of the corresponding section in the input image are used to execute the determination process in the horizontal direction.

The processing flow will be described with reference again to FIGS. 7A and 7B. In step S710 (determination process in the horizontal direction), the process is applied to the upper side and the lower side after deformation. This is because the magnification ratio in the shape after deformation is the maximum on one of the upper side and the lower side. In step S711, the number of pixels in which the X direction magnification ratio after deformation exceeds the threshold in the input image is calculated in the input image. In step S712, the number of pixels in which the X direction magnification ratio after deformation exceeds the threshold is calculated in the output image. In step S713, it is determined whether the horizontal output rate of the cache memory 110 falls within one horizontal synchronizing signal period. In the present embodiment, when the number of pixels of one line increases due to the deformation of the input image 101 by the image deformation unit 109 based on the deformation setting information 115, whether the pixels including the increased pixels can be output in the horizontal synchronizing signal period of one line is determined. More specifically, whether the pixels of the increased number of pixels can be output within a period excluding an effective signal period of horizontal data from the horizontal synchronizing signal period of one line of the input image 101 is determined. The time required to output the increment of pixels can be calculated by using the pixel output rate (output time per pixel) of the cache memory 110. Therefore, the following determination process is specifically executed.

$$[\text{dstOverPixel} - \text{srcOverPixel}] \times \text{RatePerPixel} < H\text{total} - H\text{DataEnable}$$

Variables: meaning

Htotal: horizontal synchronizing signal period of the input synchronizing signal 602.

HDataEnable: horizontal data effective signal period of the input synchronizing signal 602 srcOverPixel: the number of pixels 502 of the section corresponding to the section where the X direction magnification ratio after deformation exceeds the threshold in the input image dstOverPixel: the number of pixels 505 of the section where the X direction magnification ratio after deformation exceeds the threshold in the output image RatePerPixel: pixel output rate (output time per pixel) of the cache memory 110

If one of the determinations in step S713 is violated, the process moves to step S716, and deformation disapproval is output as deformation availability information. The process moves to step S717, and the process ends. On the other hand, if none of the determinations is violated, the process moves to step S715, and deformation approval is output as deformation availability information. The process moves to step S717, and the process ends.

Through the process shown in FIGS. 7A and 7B, the deformation determination unit 107 calculates the deformation availability information 117, and the image deformation apparatus 100 controls the deformation based on the deformation availability information 117. As a result, the image deformation apparatus of the present embodiment can include the determination unit of deformation restrictions to prevent the output of a ruined deformed image, while including the cache memory to improve the processing capacity. Although the configuration of deforming the image when the input image is written in the frame memory 111 has been described in the embodiment, the embodiment can also be applied to the configuration of deforming the image when the image is read from the frame memory 111.

A flow of data in this case will be specifically described. The input image 101 is input from the image writing unit 105 to the frame memory 111 and is output as the output image 102 from the image reading unit 113, sequentially through the cache memory 110 and the image deformation unit 109. The image reading unit 113 provides the image deformation unit 109 with coordinates in a scan order instructed by the output synchronizing signal 104 (for example, display scan order of display). The image deformation unit 109 calculates coordinates before deformation relative to the provided coordinates and makes a request to the cache memory 110. If the cache memory 110 holds the deformed pixel image data 119 of the requested coordinates before deformation, the cache memory 110 outputs the data to the image deformation unit 109. On the other hand, if the cache memory 110 does not hold the deformed pixel image data 119, the cache memory 110 requests the frame memory 111 for the deformed tile image data 120 including the deformed pixel image data 119. The cache memory 110 temporarily holds the data in the cache and outputs the data to the image deformation unit 109. In this way, the amount of deformation from the input image 101 to the output image 102 and the capacity of the cache memory are compared as described above in the configuration in which the image is deformed when the image is read from the frame memory 111.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-153832, filed Jul. 24, 2013, which is hereby incorporated by reference herein in its entirety.

What is claimed is:

1. An image processing apparatus comprising:
    an obtaining unit configured to obtain image data;
    an input unit configured to input a parameter related to a deformation process for the obtained image data;
    a processing unit configured to generate image data for projection by performing the deformation process to the obtained image data based on the parameter input by the input unit; and
    a control unit configured to determine whether an angle between the obtained image data and the image data for projection is out of a predetermined range and to control said processing unit not to perform the deformation process if said control unit determines that the angle between the obtained image data and the image data for projection is out of the predetermined range.

2. The image processing apparatus according to claim 1, further comprising
    a memory control unit configured to perform control for writing the deformation-processed image data from a cache memory to a frame memory or control for reading the deformation-processed image data from the cache memory, wherein
    the predetermined range is determined based on the parameter and a configuration of the cache memory.

3. The image processing apparatus according to claim 1, further comprising
    a memory control unit configured to perform control for writing the deformation-processed image data from a cache memory to a frame memory or control for reading the deformation-processed image data from the cache memory, wherein
    the predetermined range is determined based on the parameter and an output speed of data from the cache memory to the frame memory.

4. The image processing apparatus according to claim 1, wherein said control unit determines whether a first angle based on a first line of a frame corresponding to the obtained image data and a first line of a frame corresponding to the image data for projection is out of the predetermined range, determines whether a second angle based on a last line of the frame corresponding to the obtained image data and a last line of the frame corresponding to the image data for projection is out of the predetermined range, and controls said processing unit not to perform the deformation process if said control unit determines that at least one of the first and second angles is out of the predetermined angle range.

5. The image processing apparatus according to claim 1, further comprising a projection unit configured to project an image, which indicates that the deformation process based on the parameter cannot be performed.

6. The image processing apparatus according to claim 1, wherein the deformation process is keystone process.

7. An image processing method comprising:
    an obtaining step of obtaining image data;
    an input step of inputting a parameter related to a deformation process for the obtained image data;
    a processing step of generating image data for projection by applying the deformation process to the obtained image data based on the parameter input in said input step; and
    a control step of determining whether an angle between the obtained image data and the image data for projection is out of a predetermined range and controlling said processing step not to perform the deformation process if it is determined that a magnification related to the deformation process for the obtained image data based on the parameter input in said input step is out of a predetermined range.

8. The image processing method according to claim 7, further comprising
    a memory control step of performing control for writing the deformation-processed image data from a cache memory to a frame memory or control for reading the deformation-processed image data from the cache memory, wherein
    the predetermined range is determined based on the parameter and a configuration of the cache memory.

9. The image processing method according to claim 7, further comprising
    a memory control step of performing control for writing the deformation-processed image data from a cache memory to a frame memory or control for reading the deformation-processed image data from the cache memory, wherein
    the predetermined range is determined based on the input parameter and an output speed of data from the cache memory to the frame memory.

10. The image processing method according to claim 7, wherein in said control step, whether a first angle based on a first line of a frame corresponding to the obtained image data and a first line of a frame corresponding to the image data for projection is out of the predetermined range is determined, whether a second angle based on a last line of the frame corresponding to the obtained image data and a last line of the frame corresponding to the image data for projection is out of the predetermined range is determined, and said processing step is controlled not to perform the deformation process if it is determined that at least one of the first and second angles is out of the predetermined range.

11. The image processing method according to claim 7, further comprising a projection step of projecting an image, which indicates that the deformation process based on the parameter cannot be performed.

12. A non-transitory storage medium storing a program for causing a computer to perform the following image processing method, the program comprising:
   an obtaining step of obtaining image data;
   an input step of inputting a parameter related to a deformation process for the obtained image data;
   a processing step of generating image data for projection by applying the deformation process to the obtained image data based on the parameter input in said input step; and
   a control step of determining whether an angle between the obtained image data and the image data for projection is out of a predetermined range and controlling said processing step not to perform the deformation process if it is determined that a magnification related to the deformation process for the obtained image data based on the parameter input in said input step is out of a predetermined range.

13. The non-transitory storage medium according to claim 12, further comprising a memory control step of performing control for writing the deformation-processed image data from a cache memory to a frame memory or control for reading the deformation-processed image data from the cache memory, wherein the predetermined range is determined based on the parameter and a configuration of the cache memory.

14. The non-transitory storage medium according to claim 12, further comprising a memory control step of performing control for writing the deformation-processed image data from a cache memory to a frame memory or control for reading the deformation-processed image data from the cache memory, wherein the predetermined range is determined based on the input parameter and an output speed of data from the cache memory to the frame memory.

15. The non-transitory storage medium according to claim 12, wherein in said control step, whether a first angle based on a first line of a frame corresponding to the obtained image data and a first line of a frame corresponding to the image data for projection is out of the predetermined range is determined, and whether a second angle based on a last line of the frame corresponding to the obtained image data and a last line of the frame corresponding to the image data for projection is out of the predetermined range is determined, and said processing step is controlled not to perform the deformation process if it is determined that at least one of the first and second angles is out of the predetermined range.

16. The non-transitory storage medium according to claim 12, further comprising a projection step of projecting an image, which indicates that the deformation process based on the parameter cannot be performed.

* * * * *